United States Patent Office 3,296,510
Patented Jan. 3, 1967

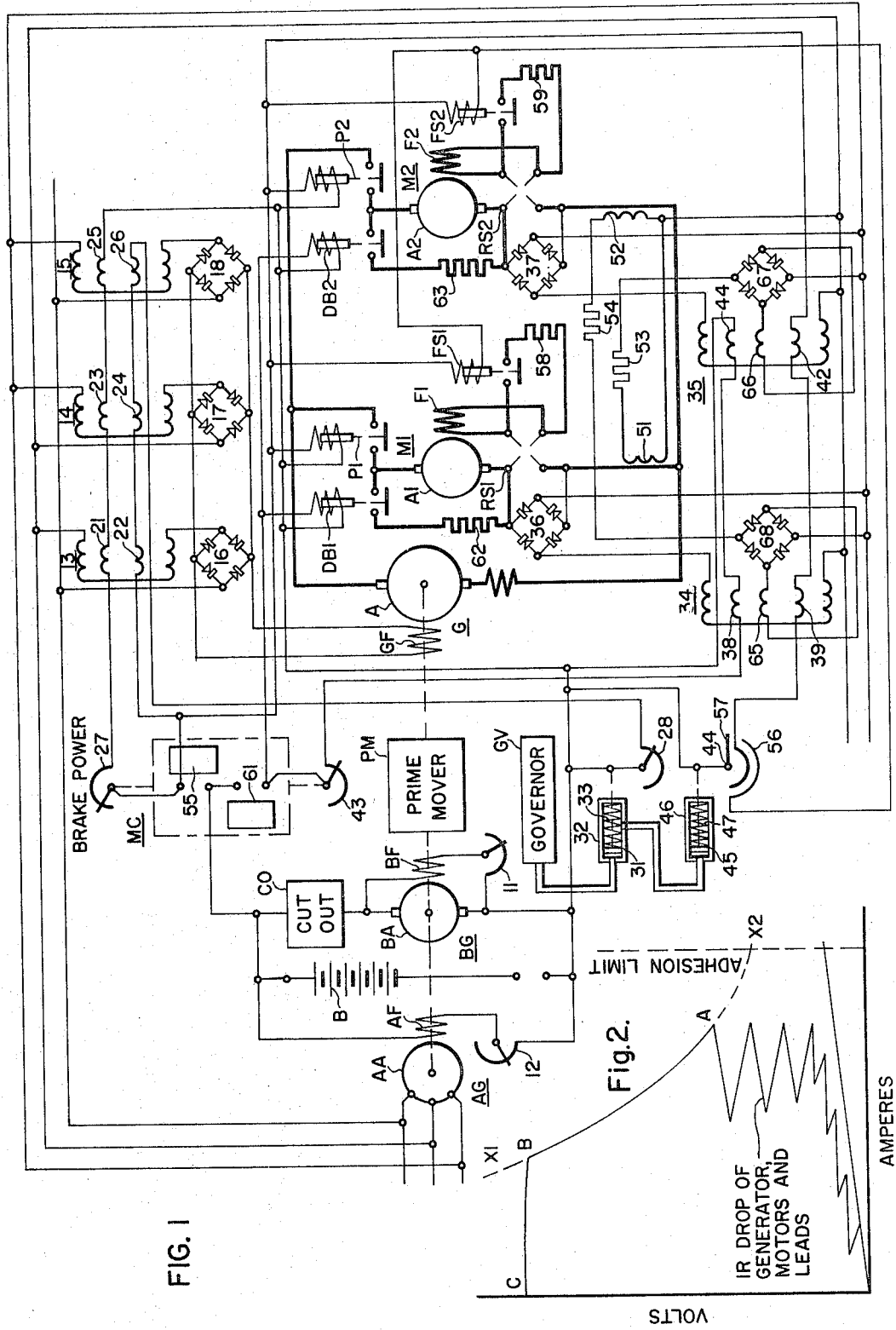

3,296,510
PLURAL MOTOR TRACTION CONTROL BY FIELD CONTROL
John J. Stamm, Export, Pa., assignor to Westinghouse Electric Corporation, Pittsburgh, Pa., a corporation of Pennsylvania
Filed June 25, 1963, Ser. No. 290,375
10 Claims. (Cl. 318—52)

This invention relates, generally, to control systems and, more particularly, to systems for controlling the operation of self-propelled rail vehicles, such as locomotives having prime movers which drive generators for supplying power to electric motors for propelling the locomotives.

In the general field of transportation, the direct current series motor is applied extensively due to its wide range of speed and torque. However, the flexibility of the series motor has some disadvantages, particularly when applied to self-propelled rail vehicles. Under unfavorable rail conditions, adhesion may drop to the point where slipping of wheels will occur. As a result, motor current will drop, reducing the series motor field and causing the motor to speed up further until, unless checked, the motor will destroy itself. Therefore, it is customary to provide wheel slip protection which, in most instances, consists of a means to detect slipping by comparison of the speeds of different wheels or of wheel speed with locomotive speed, and utilizing the resulting difference to either lower the impressed motor voltage or cut the slipping motor out of the circuit until the motor speed has been reduced. Thus, it is quite apparent that under adverse rail conditions, slipping prevents the utilization of the full capability of a locomotive.

An object of this invention is to prevent slipping of the driving wheels of a locomotive or other vehicle propelled by electric motors having series field windings.

Another object of the invention is to provide for stepless shunting of the series field windings of the propelling motors of a vehicle during acceleration of the vehicle.

A further object of the invention is to provide for dynamic braking of a vehicle propelled by a plurality of parallel-connected series motors.

Other objects of the invention will be explained fully hereinafter or will be apparent to those skilled in the art.

In accordance with one embodiment of the invention, traction motors for a locomotive are connected across a generator driven by a prime mover, and slipping of the wheels driven by any one motor is prevented by connecting a source of direct current electromotive force across the series field winding of each motor. The output from each D.C. source is controlled by a transductor responsive to the armature current in another motor, thereby balancing the speed of each motor against that of another and strengthening a motor field as soon as slipping occurs. Thus, the motor can no longer accelerate above the speed of the other motor since strengthening the field will actually lower the motor speed. Field shunting is accomplished in a smooth manner by utilizing the separate excitation source to control current shunted through a resistor connected across each field winding by a field shunting switch. Likewise, dynamic braking is accomplished by opening the field shunting switches and the power switches for the motors and closing braking switches to connect a resistor across each motor armature. The braking rate is controlled by controlling the field excitation supplied by the separate source.

For a better understanding of the nature and objects of the invention, reference may be had to the following detailed description in which:

FIGURE 1 is a diagrammatic view of a power system embodying principal features of the invention, and FIG. 2 is a curve showing operating characteristics of the main generator of the power system.

Referring to the drawing, and particularly to FIG. 1, the system shown therein comprises a main generator G, a battery generator BG, an auxiliary generator AG, all of which are driven by a prime mover PM, and traction motors M1 and M2. The prime mover PM is preferably a diesel engine or a gas turbine. The main generator G is of the direct current type having an armature winding A and a separately excited field winding GF. The battery generator BG is also of the direct current type suitable for charging a battery B. The battery generator BG has an armature winding BA and a shunt field winding BF. The armature BA is connected across the battery B in series with a cut out CO which may be of the usual type. A rheostat 11 is provided in the circuit of the shunt field winding BF to adjust the rate at which the generator charges the battery B. The auxiliary generator AG is a three-phase alternating current generator having an armature winding AA and a field winding AF which is energized from the battery B. A rheostat 12 is provided in the circuit of the field winding AF to adjust the voltage of the generator AG. If desired, the battery generator BG may be omitted and a rectifier provided to charge the battery from the A.C. generator AG.

The traction motors M1 and M2 are of the series type suitable for propelling a locomotive or other vehicle. The motor M1 has an armature winding A1 and a series field winding F1. The motor M2 has an armature winding A2 and a series field winding F2. Reversing switches RS1 and RS2 are provided for reversing the direction of current through the field windings F1 and F2, respectively, to control the direction of operation of the locomotive or vehicle. The motors M1 and M2 are connected to the generator G in parallel circuit relation by means of switches P1 and P2, respectively. Additional motors may be provided and all motors connected in series parallel relation. Provision is made for shunting the field windings F1 and F2 by means of switches FS1 and FS2, respectively. Dynamic braking circuits for the motors M1 and M2 may be established by means of switches DB1 and DB2, respectively. The operation of the dynamic braking switches and the field shunting switches will be described more fully hereinafter.

As described and claimed in a copending application of John J. Stamm, Serial No. 290,374, filed June 25, 1963, the main generator field GF is excited by the three-phase auxiliary generator AG. The excitation current is controlled by three saturable reactors or magnetic amplifiers 13, 14 and 15 whose output is rectified by three full-wave rectifiers 16, 17 and 18, respectively. The rectifiers are connected to the field winding GF in parallel circuit relation. The reactor 13 has control windings 21 and 22, the reactor 14 is provided with control windings 23 and 24, and the reactor 15 has control windings 25 and 26. The control windings 21, 23 and 25 are energized from the battery B. A rheostat 27, which is actuated by a master controller MC, is provided for raising or lowering the current in the control windings as a function of the controller position. The control windings 22, 24 and 26 are also energized from the battery B. A load regulating rheostat 28, which is actuated by a governor GV, is provided for controlling the current in the windings 22, 24 and 26 as a function of the speed of the prime mover PM. The load regulating rheostat 28 is actuated by a piston 31 disposed in a cylinder 32 which receives fluid under pressure from the governor GV. A spring 33 opposes the force exerted by the fluid pressure. Static load regulating means such as a magnetic amplifier, may be utilized if desired.

Since the motor field windings F1 and F2 are series windings, they are normally energized by the armature current of the motors M1 and M2, respectively. The excitation of the field windings F1 and F2 during dynamic braking of the motors, is supplied from one phase of the auxiliary generator AG through saturable reactors 34 and 35, respectively. The output of the reactors 34 and 35 is rectified by rectifiers 36 and 37, respectively which are connected across the field windings F1 and F2 through the reversing switches RS1 and RS2, respectively. The reactor 34 is provided with control windings 38, 39 and 65. The reactor 35 is provided with control windings 41, 42 and 66. During dynamic braking, the control windings 38 and 41 are energized from the battery B. A rheostat 43, which is actuated by the controller MC, is provided for controlling the current in the control windings 38 and 41, thereby controlling the excitation of the motor fields to control the dynamic braking current.

The saturable reactors 34 and 35 are also utilized to control field shunting of the motors M1 and M2. During field shunting, the energization of the control windings 39 and 42 from the battery B is controlled by a rheostat 44 which is actuated by a piston 45 disposed in a cylinder 46 which is supplied with fluid from the governor GV. A spring 47 in the cylinder 46 opposes the force of the pressure fluid. The operation of the rheostat 44 during field shunting will be described more fully hereinafter.

In order to prevent wheel slippage under adverse rail conditions, provision is made for strengthening the field of the motor which drives the slipping wheels by separately exciting the field winding of the motor from the single phase A.C. source through the proper rectifier 36 or 37. The separate excitation of the field winding F1 of the motor M1 is controlled by a transducer 52, and the excitation of the field winding F2 of the motor M2 is controlled by a transductor 51. Each transductor is a saturable reactor in which the conductor carrying the motor armature current acts as a single turn control winding. Thus, the transductor 51 is responsive to the armature current of the motor M1 and the transductor 52 is responsive to the armature current of the motor M2. The outputs of the transductors 51 and 52 are rectified by rectifiers 67 and 68, respectively, and the output current may be adjusted by means of rheostats 53 and 54, respectively. The rectifier 67 is connected to the control winding 66 on reactor 35, and the rectifier 68 is connected to the control winding 65 on reactor 34.

Under normal conditions, with the motors operating at the same speed and with no wheel slippage, the motor curents and the voltage drops across the field windings F1 and F2 are equal. The output voltage of the rectifiers 36 and 37, under these conditions, are equal to or slightly less than the voltage drops across the field windings so that they do not affect the field excitation of either motor. If the wheels driven by one motor start to slip, however, the current in that motor decreases, because of the reduced load. If the current of motor M1, for example, decreases for this reason, the voltage across the field winding F1 correspondingly decreases and falls below the voltage of rectifier 36 which is maintained because it is controlled by the transductor 52 through the control winding 65 of saturable reactor 34. Current will therefore flow from rectifier 36 through the field winding F1, providing separate excitation to increase the field and reduce the speed of motor M1. At the same time, the decrease in motor current will tend to cause a rise in the generator voltage which will tend to increase the current of motor M2. Since the transductor 52 is responsive to the current of motor M2, the output of rectifier 36 will be increased to increase the field excitation of motor M1 and further reduce its speed.

Thus, the tendency of motor M1 to slip is suppressed at its inception since strengthening the field will actually result in lowering the motor speed. Slipping will be reduced, followed, in turn, by a reduction in the field strengthening effect. This action will continue until the voltage drop across the series field caused by the armature current again equals the voltage produced by the rectifier 36 which is controlled through the transductor 52, the output of which is controlled by the current in the motor M2 which is normal since the wheels driven by this motor are not slipping.

It will be understood that the wheels on the leading axle of a locomotive or vehicle truck usually have the greater tendency to slip because of weight transfer during acceleration of the vehicle. Thus, if the vehicle is operating in the opposite direction and the wheels driven by the motor M2 slip, the rectifier 37 supplies excitation current to the field winding F2, controlled by the transductor 51, to correct the slipping condition.

In the foregoing manner, the control of the separate field excitation is under the control of static devices, such as the transductors 52 and 52, which are responsive to differences in motor currents resulting from differences in the speeds of the wheels driven by the respective motors. Under normal non-slipping conditions, the currents in the two motors are equal and the separate excitation is ineffective. Under slipping conditions, separate excitation is supplied to the field of the slipping motor under control of the transductor connected in the circuit of another motor. The strengthening of the field of the slipping motor causes it to operate with a shunt motor characteristic to correct the slipping condition. In this manner, the slipping condition is corrected without it being necessary to reduce the voltage applied to the non-slipping motors. The correction affects only the slipping motor. It is thus possible to initiate corrective action as soon as only a small amount of slipping occurs, reducing the speed differential to a small value and causing negligible loss of tractive effort since full voltage is applied to the motors.

It is assumed that the prime mover PM is controlled by the master controller in any usual manner either by electrical, mechanical, or pneumatic means. It is also assumed that the reversing switches are operated in the usual manner. Thus, the locomotive or vehicle may be accelerated by operating the master controller MC to a "Power" position. When the controller MC is in a "Power" position, the actuating coils of the switches P1 and P2 are energized through a contact segment 55, thereby closing the switches to connect the motor M1 and M2 across the generator G. The field winding GF of the generator G is energized through the reactors 13, 14 and 15. The control windings 21, 23 and 25 on these reactors are energized through the segment 55 and the rheostat. The energization of the control windings is controlled by the rheostat 27 which is operated by the controller MC, thereby permitting the generator voltage to be increased to increase the current supplied to the traction motors.

Referring to the generator volt-ampere curve, shown in FIG. 2, the current will rise as shown by the heavy line depending upon the operation of the master controller. The movement of the master controller handle will increase the saturable reactor control circuit current, increasing generator excitation, thereby raising the generator voltage and finally bringing the current to the point where the adhesion limit might be exceeded. If the adhesion limit is exceeded, wheels will start to slip. However, due to the relatively flat volt-ampere characteristic of the generator and further, since the motors are connected in parallel, no excess slipping should occur. As explained hereinbefore, any slipping that does occur will be corrected by increasing the excitation of the field of the motor driving the slipping wheels in the manner hereinbefore described.

Assuming that the control is operated so as not to exceed the adhesion limit, the generator current and voltage will follow the heavy line until the line of constant horsepower X1–X2 is reached at point A. When the volt and ampere values exceed the constant horsepower line, the prime mover is overloaded and will slow down. The governor will attempt to correct this by operating the rheostat 28 to insert resistance into the circuit for the control windings 22, 24, and 26 of the reactors 13, 14 and 15, respectively. Further acceleration of the locomotive will increase the counter-electromotive force of the motors and thus reduce the motor current. The generator output will drop below the constant horsepower output and the prime mover will increase its speed. The governor will operate to decrease the resistance in the generator field control circuit, thus raising the generator voltage until constant horsepower is reached.

Further acceleration will gradually raise the generator voltage to its maximum value, point B on the curve. The generator excitation is now at its maximum and the rheostat 28 has all of its resistance cut out of the reactor control circuit. Further acceleration will result in unloading of the prime mover and the generator voltage will tend to follow the line BC. In order to prevent this, field weakening or shunting of the motor fields is introduced. When the load control rheostat 28 has reached its maximum position (all resistance cut out), a port will be exposed in the cylinder 32 to admit oil pressure to the cylinder 46 to operate the field shunting rheostat 44.

At the point of initiation of field shunting, the control windings 39 and 42 on the reactors 34 and 35, respectively are energized to maintain voltages from the rectifiers 36 and 37 equal to the value of the IR drops existing across the motor fields. The field shunting contactors FS1 and FS2 are closed at this time since their actuating coils are energized through a contact segment 56 which is engaged by a contact member 57 carried by the arm of the rheostat 44.

The closing of the field shunting switches FS1 and FS2 causes current to flow in field shunting resistors 58 and 59. However, since the separate excitation voltage is approximately equal to the existing field voltage drop before the closing of the field shunting switches, nearly all the current of resistors 58 and 59 will initially be supplied by the separate excitation.

Under the influence of the field shunting rheostat 44 which is operated by the governor, the separate excitation voltage of rectifiers 36 and 37 is gradually lowered, maintaining throughout a constant armature current, until no current is being supplied by the rectifiers. The current drawn by the resistors 58 and 59 is then supplied from the motor circuit and diverted from the field windings which are shunted by the resistors. At this point maximum field shunting has been reached without causing any current surges in the motor circuit, thus contributing to higher stability and less slipping. If slipping of a motor should occur under field shunting, the separate excitation control will again act as described previously to suppress slipping.

Dynamic braking is accomplished by operating the controller MC to a "Brake" position, thereby opening the field shunting switches FS1 and FS2 and also opening the power switches P1 and P2, and closing the dynamic braking switches DB1 and DB2. The actuating coils of the dynamic braking switches are energized through a contact segment 61 on the controller MC. The closing of the switches DB1 and DB2 connects dynamic braking resistors 62 and 63 across the armatures A1 and A2 of the motors M1 and M2, respectively. The field windings F1 and F2 of the motors are separately excited through the reactors 34 and 35 and the rectifiers 36 and 37, respectively. The separate excitation is controlled by controlling the current in the control windings 38 and 41 of the reactors 34 and 35, respectively, by means of the rheostat 43 which is actuated by the controller MC. Thus, dynamic braking can be controlled over the range established by the dynamic braking resistors. Current and voltage limits can be designed into the static control for the separate excitation, thereby permitting maximum safe utilization of dynamic braking.

From the foregoing description, it is apparent that the invention provides for effective wheel slip control in its initial stage before the wheels have attained any great differential in wheel speed. The invention permits operation of a locomotive or vehicle without lowering the effective output of any other wheels except the wheels with the momentary lowered adhesion point. The wheel slip control means can also be utilized to provide smooth field shunting and complete control of excitation of the motors during dynamic braking. As an additional benefit, the field shunting control can be utilized to establish a minimum motor field excitation, equivalent to the maximum allowable wheel or locomotive speed.

In order to simplify the drawing and description, only two traction motors have been illustrated. It will be understood that additional motors may be provided and connected in the manner of the two motors shown herein or in series-parallel relation. It will also be understood that static control devices of other types, such as silicon controlled rectifiers may be utilized in place of the saturable reactors herein shown and described.

Since numerous changes may be made in the above described construction, and different embodiments of the invention may be made without departing from the spirit and scope thereof, it is intended that the subject matter disclosed herein shall be interpreted as illustrative and not in a limiting sense.

I claim as my invention:

1. A control system for electric traction motors, said system including a direct current generator, at least one pair of motors connected to the generator, each motor having an armature and a series-connected field winding, a separate source of direct current excitation for each of said field windings, and means for controlling the separate excitation source of the field winding of each motor of a pair in response to the current of the other motor of the pair.

2. A control system for electric traction motors, said system including a direct current generator, at least one pair of motors connected to the generator, each motor having an armature and a series-connected field winding, a separate source of direct current excitation connected across each of said field windings, and means for controlling the voltage of the separate excitation source of the field winding of each motor of a pair in response to the current of the other motor of the pair such that under normal operating conditions the voltages of the separate excitation sources do not exceed the voltages across the corresponding field windings but in case of a decrease in current of one motor, the voltage of its separate excitation source is relatively increased to strengthen the field excitation of said one motor.

3. A control system for electric traction motors, said system including a direct current generator, at least one pair of motors connected to the generator, each motor having an armature and a series-connected field winding, a separate source of direct current excitation connected across each of said field windings, each of said separate excitation sources including saturable reactor means for controlling the voltage of the source, and the saturable reactor means of the excitation source of the field winding of each motor of a pair having a control winding energized in response to the current of the other motor of the pair.

4. A control system for electric traction motors, said system including a direct current generator, at least one pair of motors connected to the generator, each motor having an armature and a series-connected field winding, a separate source of direct current excitation connected across each of said field windings, means for disconnecting the motors from the generator and for connecting a braking resistor across the armature of each motor for dynamic braking, and means for controlling the voltages of said separate sources of excitation during braking to control the field excitation of the motors.

5. A control system for electric traction motors, said system including a direct current generator, at least one pair of motors connected to the generator, each motor having an armature and a series-connected field winding, a separate source of direct current excitation connected across each of said field windings, means for controlling the voltage of the separate excitation source of the field winding of each motor of a pair in response to the current of the other motor of the pair, means for disconnecting the motors from the generator and for connecting a braking resistor across the armature of each motor for dynamic braking, and braking control means for controlling the voltages of the separate sources of excitation to control the field excitation of the motors.

6. A control system for electric traction motors, said system including a direct current generator, at least one pair of motors connected to the generator, each motor having an armature and a series-connected field winding, a separate source of direct current excitation connected across each of said field windings, each of said separate excitation means including saturable reactor means for controlling the voltage of the source, each saturable reactor means having first and second control windings, the first control winding of the saturable reactor means of the excitation source of the field winding of each motor of a pair being energized in response to the current of the other motor of the pair, means for disconnecting the motors from the generator and for connecting a braking resistor across the armature of each motor for dynamic braking, and braking control means for controlling the energization of the second control windings of all the saturable reactor means to control the field excitation of the motors.

7. A control system for electric traction motors, said system including a direct current generator having a field winding, a prime mover for driving the generator, a controller, means for controlling the excitation of the generator field winding in response to the position of the controller and to the speed of the prime mover, a plurality of motors connected to the generator, each of said motors having an armature and a series-connected field winding, a separate source of direct current excitation connected across each of the motor field windings, a shunting resistor for each of the motor field windings, and means operative when the generator field excitation has reached its maximum value to connect the shunting resistors across the motor field windings and to decrease the voltages of said separate sources of excitation below the voltages across the corresponding motor field windings.

8. A control system for electric traction motors, said system including a direct current generator having a field winding, a prime mover for driving the generator, a controller, means for controlling the excitation of the generator field winding in response to the position of the controller and to the speed of the prime mover, a plurality of motors connected to the generator, each of said motors having an armature and a series-connected field winding, a separate source of direct current excitation connected across each of the motor field windings, a shunting resistor for each of the motor field windings, means for connecting the shunting resistors across the motor field windings when the generator field excitation has reached its maximum value, and means for controlling the voltages of said separate sources of excitation such that said voltages are substantially equal to the voltages across the corresponding motor field windings when the shunting resistors are connected and are thereafter decreased to increase the amount of current shunted from the motor field windings by the shunt-resistors.

9. A control system for electric traction motors, said system including a direct current generator having a field winding, a prime mover for driving the generator, a controller, means for controlling the excitation of the generator field winding in response to the position of the controller and to the speed of the prime mover, at least one pair of motors connected to the generator, each of said motors having an armature and a series-connected field winding, a separate source of direct current excitation connected across each of the motor field windings, means for controlling the voltage of the separate excitation source of the field winding of each motor of a pair in response to the current of the other motor of the pair, a shunting resistor for each of the motor field windings, means operative when the generator field excitation has reached its maximum value to connect the shunting resistors across the motor field windings and to decrease the voltages of said separate sources of excitation below the voltages across the corresponding motor field windings, means for disconnecting the motors from the generator and for connecting a braking resistor across the armature of each motor for dynamic braking, and braking control means for controlling the voltages of the separate sources of excitation to control the field excitation of the motors.

10. A control system for electric traction motors, said system including a direct current generator having a field winding, a prime mover for driving the generator, a controller, means for controlling the excitation of the generator field winding in response to the position of the controller and to the speed of the prime mover, at least one pair of motors connected to the generator, each of said motors having an armature and a series-connected field winding, a separate source of direct current excitation connected across each of the motor field windings, each of said separate excitation means including saturable reactor means for controlling the voltage of the source, each saturable reactor means having first, second and third control windings, the first control winding of the saturable reactor means of the excitation source of the field winding of each motor of a pair being energized in response to the current of the other motor of the pair, a shunting resistor for each of the motor field windings, means operative when the generator field excitation has reached its maximum value to connect the shunting resistors across the motor field windings and to energize the second control windings of the saturable reactor means to decrease the voltages of said separate sources of excitation below the voltages across the corresponding motor field windings, means for disconnecting the motors from the generator and for connecting a braking resistor across the armature of each motor for dynamic braking, and braking control means for controlling the energization of the third control windings of all the saturable reactor means to control the field excitation of the motors during braking.

References Cited by the Examiner
UNITED STATES PATENTS

| 2,315,386 | 3/1943 | Baldwin | 317—71 X |
| 2,515,982 | 7/1950 | Brane | 318—58 X |
| 2,626,362 | 1/1953 | Johansson | 318—52 X |
| 2,888,621 | 5/1959 | McLane | 318—143 X |

FOREIGN PATENTS 1,337,022  10/1962  France.

OTHER REFERENCES

German application 1,042,632, November 6, 1958.

ORIS L. RADER, *Primary Examiner.*

MILTON O. HIRSHFIELD, *Examiner.*

T. LYNCH, *Assistant Examiner.*